United States Patent [19]

Brison et al.

[11] Patent Number: 5,229,085

[45] Date of Patent: *Jul. 20, 1993

[54] UTILIZATION OF OXYGEN IN LEACHING AND/OR RECOVERY PROCEDURES EMPLOYING CARBON

[75] Inventors: Robert J. Brison, Golden, Colo.; Carl L. Elmore; Phillip Mitchell, both of Glens Falls, N.Y.

[73] Assignee: Kamyr, Inc., Glens Falls, N.Y.

[*] Notice: The portion of the term of this patent subsequent to Jul. 5, 2005 has been disclaimed.

[21] Appl. No.: 247,521

[22] Filed: Sep. 22, 1988

Related U.S. Application Data

[60] Division of Ser. No. 102,742, Sep. 23, 1987, Pat. No. 4,816,234, which is a continuation of Ser. No. 732,637, May 10, 1985, abandoned.

[51] Int. Cl.$^5$ .............................. C22B 11/00
[52] U.S. Cl. ...................... 423/29; 423/30; 423/31
[58] Field of Search .............. 423/27, 29, 30, 31; 75/101 R, 105, 118 R; 204/109

[56] References Cited

U.S. PATENT DOCUMENTS

| 1,734,306 | 11/1929 | Schraps | 423/31 |
| 4,289,532 | 9/1981 | Matson et al. | 75/105 |
| 4,438,076 | 3/1984 | Pietsch et al. | 423/30 |
| 4,501,721 | 2/1985 | Sherman et al. | 423/27 |
| 4,552,589 | 11/1985 | Mason et al. | 75/118 R |
| 4,754,953 | 7/1988 | Brison et al. | 423/27 |
| 4,816,234 | 3/1989 | Brison et al. | 423/29 |

OTHER PUBLICATIONS

"Studies on the Mechanism of Gold Adsorption on Carbon", Tsuchida et al., pp. 647–656, Mineral Chem. Res. Unit, Murdoch Univ., Perth, W. Australia, 1984.

"Aspects of Laboratory and Pilot Plant Evaluation of CIP with Relation to Gold Recovery", Davidson et al., XIV Inter. Mining Processing Congress, Oct. 17–23, 1982.

"Recovery of Gold from Carbonaceous Ores at Carlin, Nevada", Guay et al., Society of Mining Engineers, AIME, Transactions–vol. 254, Mar. 1973.

"The Treatment of Refractory Gold-Bearing Flotation Concentrates Using Pressure Leaching Techniques", Muir et al., Proc. AIME Meeting, Los Angeles, Calif., Feb. 1984.

Primary Examiner—Michael Lewis
Assistant Examiner—Steven Bos
Attorney, Agent, or Firm—Nixon & Vanderhye

[57] ABSTRACT

In gold and/or silver cyanide leaching-adsorption processes employing solid adsorbents such as activated charcoal, the overall efficiency in the recovery of gold and/or silver from ores or the like is greatly increased by contacting the cyanide slurry containing the gold and/or silver, with oxygen gas instead of normal air. A generally pure oxygen gas can be bubbled into a vessel containing the slurry, and a cover (e.g. a floating cover) may be provided on the vessel to reduce the oxygen transfer out of the solution and to facilitate pressurization of the system with an oxygen atmosphere. The procedures of the invention are applicable to carbon-in-pulp (CIP), and carbon-in-leach (CIL) processes and related processes using resins. Deaeration of the ore slurry can be practiced prior to the introduction of the oxygen.

22 Claims, 3 Drawing Sheets

UTILIZATION OF OXYGEN IN LEACHING AND/OR RECOVERY PROCEDURES EMPLOYING CARBON

The present application is a division of application Ser. No. 07/102,742, filed Sept. 23, 1987, now U.S. Pat. No. 4,816,234, issued Mar. 28, 1989, which, in turn, is a continuation of application Ser. No. 06/732,637, filed May 10, 1985, now abandoned.

BACKGROUND AND SUMMARY OF THE INVENTION

Procedures that have been gaining increasing acceptance and widespread usage for the recovery of gold and/or silver from ores, and the like, are the carbon-in-pulp (CIP), and carbon-in-leach (CIL) processes. These procedures are versatile, and effect efficient recovery of the gold and/or silver from the ore.

In a typical CIP process, milled ore is leached in a series of agitated vessels (typically approximately six vessels each having a retention time of about four hours). In the leach vessels the gold and/or silver is largely dissolved from the pulp. After leaching, the pulp moves to the CIP adsorption system, which typically contains about six vessels each having a retention time of about one hour. The pulp is agitated in each of these vessels, which are open to the atmosphere, and in each vessel the pulp is contacted by activated charcoal particles (i.e. carbon granules) that preferentially adsorb gold and silver from the solution. The inventory of carbon granules is continuously or periodically transferred from one vessel to the next in the opposite direction of the flow of the pulp, with carbon discharged from the first vessel in the series ultimately being passed to a gold and/or silver recovery station, while the pulp discharged from the last vessel in the series is leach residue, which can be disposed of.

Resin-in-pulp processes are similar to carbon-in-pulp processes except that an ion exchange resin is used in place of carbon granules. Such processes have not yet received commercial acceptance for Au/Ag leaching.

Conventional CIL processes are similar to CIP processes except that the dissolution and the adsorption of the gold and silver are practiced essentially simultaneously. In a typical CIL procedure, the ground and thickened ore slurry typically passes to a series of about six agitated leach-adsorption vessels, each having a retention time of about four hours. In the agitated leach-adsorption vessels the carbon and ore flow in countercurrent paths in basically the same manner as in the CIP process, with the loaded carbon passed to a recovery stage and the discharged leach residue is disposed of. As in most cyanidation operations, part of the gold and/or silver is typically dissolved in the grinding circuit and in other preliminary processing steps, such as thickening. Although the proportion of the total metal dissolved in these steps is often substantial, subsequent treatment in a series of leach vessels, or leach-adsorption vessels, is typically practiced in order to obtain more complete gold and/or silver recovery.

It has been known for many years that, under certain limiting conditions, the rate of gold dissolution in a cyanide solution is approximately proportional to the partial pressure of oxygen, and that the rate of dissolution can be significantly increased if generally pure oxygen gas (e.g. gas having an oxygen content of about 99 percent or greater) is used instead of air to effect oxidation during the cyanidation process. However this fact has not been taken advantage of commercially.

According to the present invention, it has been found that the combination of (1) the use of oxygen or oxygen-enriched air and (2) a leach-adsorption system employing actuated carbon results in an extremely efficient process for treatment of gold and/or silver ores, or the like.

It has been found that not only does oxygen increase the rate of dissolution of gold and/or silver, but that the overall efficiency of processes employing carbon adsorption in gold and/or silver recovery is significantly increased by the use of a gas containing a significantly higher proportion of oxygen than is found in air.

Although activated carbon is well known to be a catalyst in decomposition of cyanideion by oxygen, surprisingly, it has been found that the use of oxygen rather than air in CIP or CIL systems does not result in unacceptable cyanide consumption, the cyanide consumption being unexpectedly low.

It has been found that the increased efficiency that results from the practice of the present invention has a number of contributing factors. In CIL and CIP processes, the oxygen increases the dissolution rate, which therefore makes the gold and/or silver more readily available for adsorption by the carbon. Also, since the gas that is introduced has a higher proportion of oxygen than natural air, it will also have a significantly lower proportion of carbon dioxide than normal air. Reduced carbon dioxide also increases carbon adsorption efficiency since carbon dioxide reacts with lime in the cyanide solution to form $CaCO_3$, which deposits on the carbon granules.

Practicing the invention one can either get a higher percentage of gold and/or silver extraction, or get the same percentage extraction as in conventional facilities only using much less, and/or smaller, equipment, or a combination of these advantages. For instance in a conventional CIL plant, all of the CIL tanks could be reduced to about one-fifth their normal size if oxygen were utilized instead of air to contact the solution. Further, if oxygen is utilized in a leaching process followed by CIP the large agitated leach tanks can each be reduced to about one-fifth their usual size (with commensurate reduction in the residence time in each).

Compared to conventional CIP processes, according to the invention since the gold would be adsorbed almost as soon as it was leached, the driving force for leaching of the gold would be increased, and the "preg" robbing effects in the case of carbonaceous ores would be minimized. Also the tie-up of gold in the in-process inventory would be significantly decreased.

Compared to conventional CIL processes, the process according to the invention would reduce the agitated tank size by a factor of about five or more, reduce the carbon and gold loss due to abrasion of the carbon, reduce the tie-up of gold in the in-process inventory, and reduce the carbon inventory.

The process according to the invention also has the potential for optimizing the leach time for differences in the types of ore utilized. For instance for slow leaching ores, a pressurized leach-adsorption system could be utilized to obtain higher oxygen concentration in the solution. For fast leaching ores, oxygen enriched air could be utilized to provide only a moderate increase in leach rate since little is gained by reducing the leach time below the time required for carbon adsorption (about 4–6 hours). In any event, the practice of the process according to the invention, and the utilization of the apparatus according to the present invention, is extremely advantageous.

It is the primary object of the present invention to provide for the increased efficiency of the recovery of gold and/or silver from ores or the like. This and other objects of the invention will become clear from an inspection of the detailed description of the invention, and from the appended claims.

DETAILED DESCRIPTION

The invention will be herein described with respect to the recovery of gold and/or silver from gold and/or silver containing ores or the like. The term "ore or the like" as used in the present specification and claims means all materials conventionally considered as gold and silver ores, and other materials such as tailings, from which gold and/or silver may be recovered. Also, the invention has applicability to the recovery of other metals.

In the preferred embodiment according to the present invention, activated charcoal (also known as activated carbon, carbon, and the like) is used as the material for adsorbing the gold and/or silver from the solution. However it is to be understood that other materials can be utilized, besides activated charcoal granules or particles, for adsorbing the gold and/or silver, such as ion exchange resins (i.e. a resin-in-pulp process, as described in U.S. Pat. No. 4,502,952).

Figure 1:
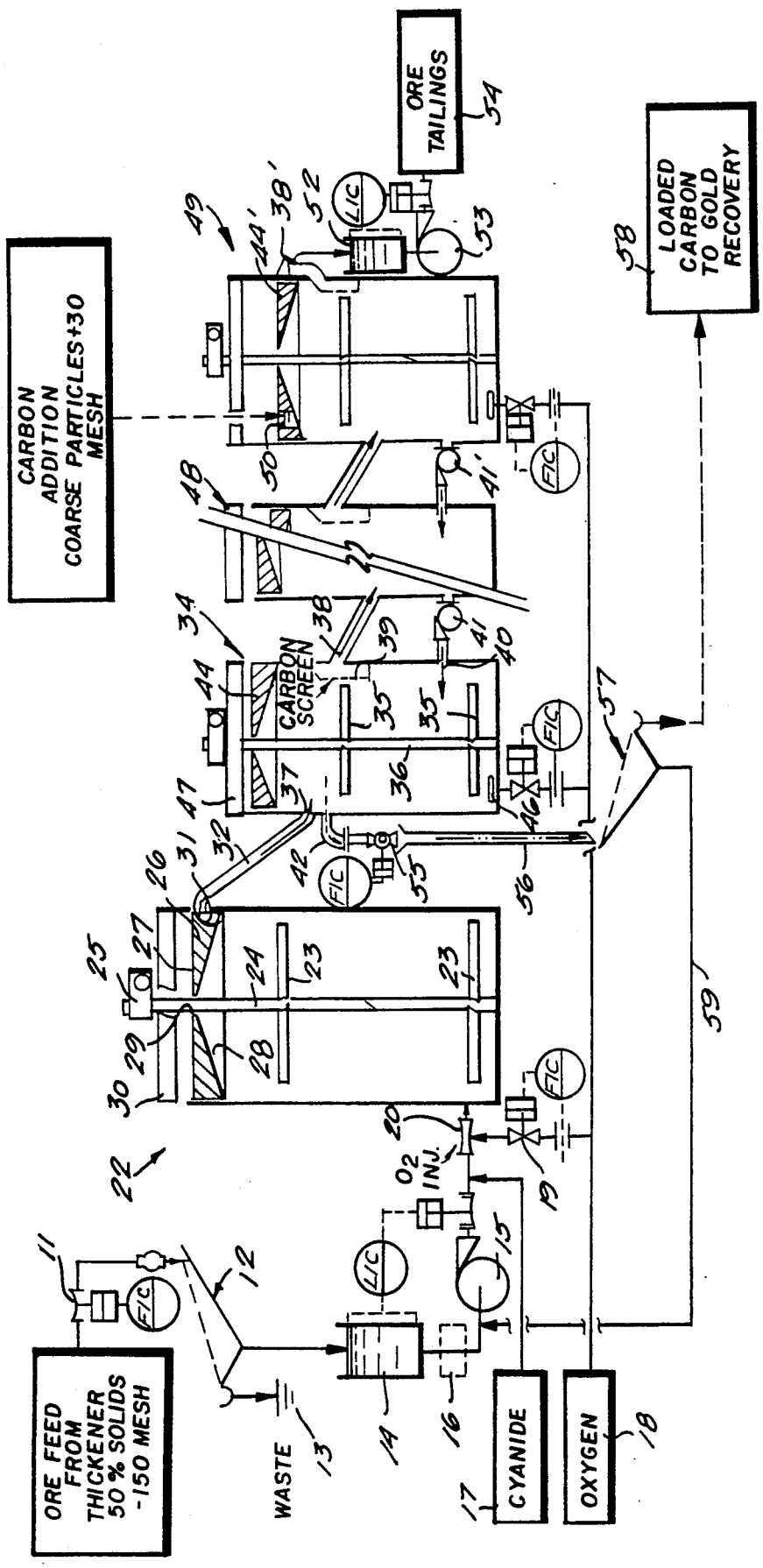
FIG. 1 is a schematic view, with parts of some components shown in cross-section, of exemplary apparatus for practicing a CIP process according to the present invention.

In the utilization of the apparatus illustrated in FIG. 1 for the practice of a CIP process according to the invention, the ore is milled in the presence of lime and possibly cyanide, and ultimately fed through the flow control valve 11 to a separating screen assembly 12 which screens out the particles that are too large, and is dumped in discharge 13. If desired, the ore slurry may be thickened by conventional means to remove part of the solution, which may be treated separately for gold and/or silver recovery. The ore slurry that passes through the screen 12 passes to the level control tank 14, and is withdrawn from the tank 14 by the pump 15. If desired, the ore slurry can be deaerated as by any type of conventional deaeration means (such as a vacuum system) 16.

After the ore slurry passes through pump 15, a conventional basic cyanide solution (such as NaCN) is added to the ore from source 17, additional lime may be added as needed, and oxygen containing gas from source 18 is added through the flow control valve 19, and oxygen injector 20. If desired the cyanide solution and the oxygen containing gas can be added to the slurry utilizing mixers, although since significant mixing will take place in subsequent vessels a separate mixer at this point is not essential.

The oxygen containing gas from source 18 preferably comprises generally pure oxygen (that is a gas containing about 99 percent or more oxygen). However the desired results according to the invention, of increased carbon adsorption efficiency, and the like, can sometimes be achieved even when generally pure oxygen is not utilized, but rather merely a gas having a significantly increased proportion of oxygen compared to normal air. The gas from source 18 also desirably, and usually inherently (merely by the increase in the proportion of oxygen), has a decreased proportion of carbon dioxide compared to normal air, which also results in decreased cyanide consumption and reduced formation of $CaCO_3$.

In the embodiment actually illustrated in FIG. 1, a single leach (or pre-leach) tank 22 is illustrated. In the tank 22 no carbon is present, but rather only leaching takes place. As described above, however, the presence of the oxygen containing gas in the leach tank 22 also increases the efficiency of the dissolution of the gold and/or silver into the cyanide solution.

The tank 22 is preferably an agitated tank, having a conventional mechanical agitator including blades 23 and shaft 24, powered by a powering device 25 or the like. The slurry within the tank 22 will achieve a certain level, and in accordance with the present invention it is desirable to provide a cover for the solution to minimize the transfer of oxygen from the slurry to the air, and also to minimize the transfer of nitrogen from the air to the slurry. A conventional stationary cover tank may be provided, or, a floating cover is provided, such as the disc-shaped cover 26 which has a generally flat top surface 27, and a generally concave bottom surface 28 which is actually in contact with the slurry, and which has an aperture 29 therein through which the shaft 24 passes. If desired, a permanent lid 30 may also be placed on the tank 22, and the entire tank provided with an oxygen atmosphere at about one atmosphere pressure, or provided with an oxygen atmosphere at significantly greater than one atmosphere pressure.

Only one leach tank 22 is shown. Typically there would be about 4 to 6 more such tanks in series to minimize short-circuiting of the slurry particles.

After the desired retention time in the leach tank 22, the slurry overflows from tank 22, or through cut-out 31 in the cover 26, and through the conduit 32 into the first carbon adsorption tank 34 of a series of such tanks. Three tanks are shown in series in FIG. 1, however any desired number of tanks may be provided.

Conventional components of the tank 34 include the mechanical agitator including blades 35 and shaft 36, the slurry inlet 37, the slurry outlet 38 covered by a carbon screen 39 (e.g. see U.S. Pat. No. 4,416,774), carbon inlet 40 connected up to carbon pump 41, and carbon outlet 42. The pumps 41, 41' may be placed near the top of the tank. The tank 34 may be a conventional covered tank, or may include a non-conventional floating cover 44 which is substantially identical to the cover 26 (except there is no necessity for the cut-out 31), which floats on the top of the slurry within the tank 34. The floating cover can be a plurality of floating balls.

Non-conventional components of the tank 34 also include the sparger 46 located adjacent the bottom of the tank for sparging oxygen into the tank from the source 18. The sparger 46, in addition to introducing the oxygen into the solution that is necessary for the increased efficiency according to the invention, also effects some agitation of the solution, facilitating efficient dissolution of the oxygen.

Another non-conventional component of the tank 34 comprises the top 47. The top 47, as does the top 30, can seal the tank so that an oxygen atmosphere (either at one atmosphere pressure, or significantly greater than one atmosphere pressure) may be maintained in the tank.

The further tanks 48, 49, etc. in the adsorption system are each substantially identical to the tank 34 except that in the last tank 49 in the series the cover 44' has disposed therein a valved opening 50 which allows the addition of activated charcoal particles, which are coarser than the ore particles in the slurry (the difference in coarseness allowing effective screening).

The slurry discharged through outlet 38' of the tank 49 goes to tank 52, and from tank 52 is withdrawn by pump 53 and ultimately passed to a disposal site 54 for the ore tailings (which is what the pulp has been reduced to). The carbon particles outlet 42 from the first tank 34 passes through flow control valve 55 to chute 56, and ultimately to the carbon screen 57, with separated loaded carbon being passed to the gold and/or silver recovery station 58, and separated slurry in conduit 59 being recirculated.

The apparatus of FIG. 1 can also be utilized for a carbon-in-leach process merely by elimination of the tank 22. Such an arrangement is especially advantageous, and the size and/or number of tanks 34, 48, 49 would be less than for conventional CIL processes.

Figure 2:
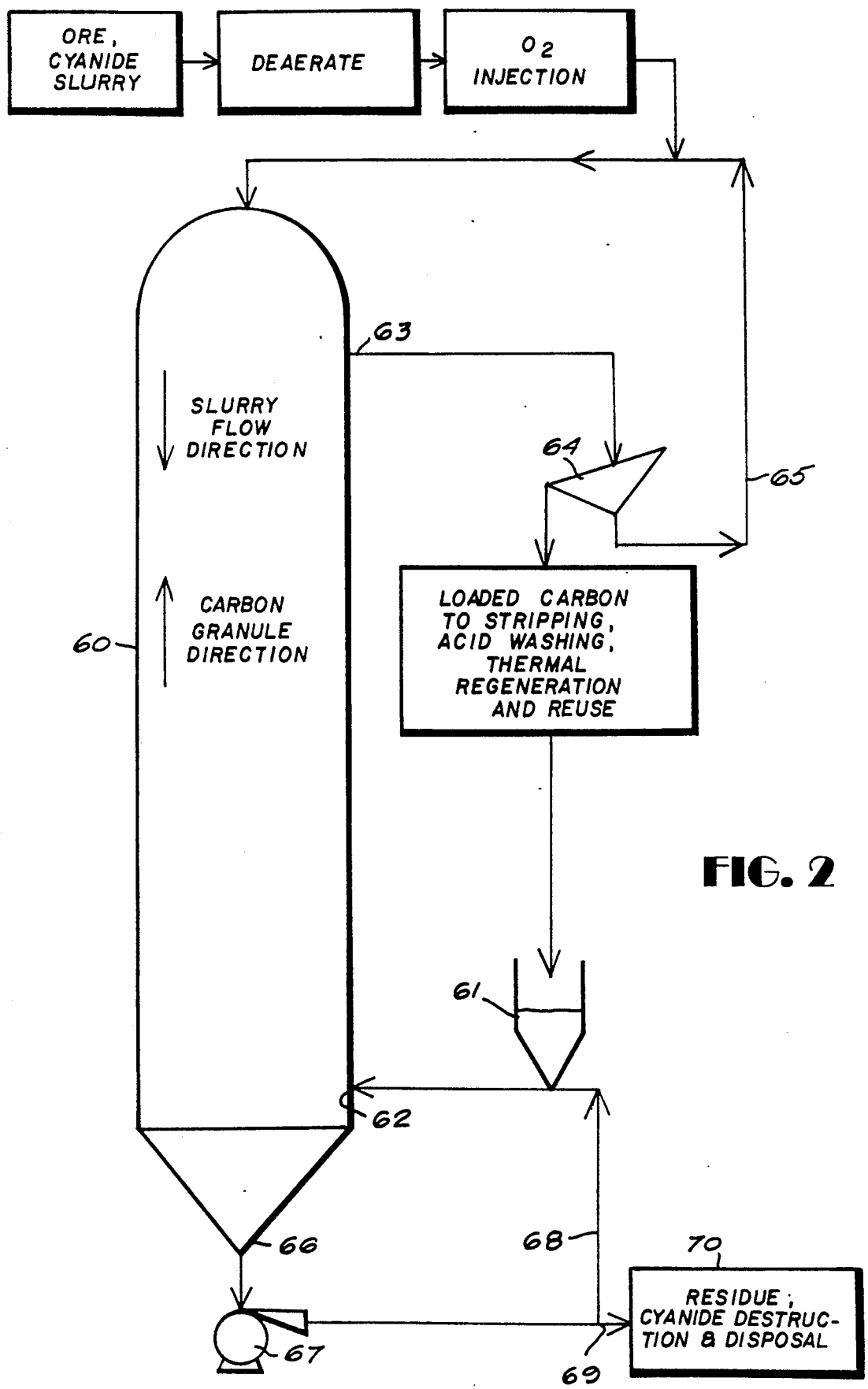
FIG. 2 is a schematic view of exemplary apparatus for practicing a CIL process according to the invention.

FIG. 2 schematically illustrates another form the apparatus according to the invention can take for the practice of a CIL process. The ore slurry, mixed with oxygen, passes into the top of vertical vessel 60, and flows continuously downwardly therein. Typical conditions of the ore slurry would be 50 percent solids (minus 100 mesh), 0.3 g/l NaCN, solids specific gravity of 2.7, and a slurry specific gravity of 1.46. The activated charcoal granules would be introduced from source 61 into the bottom of the vessel 60 at point 62, and would flow upwardly in the vessel. Typically the carbon granules would be relatively large, about 6–16 mesh, and would have a lower specific gravity than the slurry (e.g. 1.2). The slurry density, carbon density and size, and other factors (such as the addition of flocculent or fibers to the slurry) could be adjusted to optimize the carbon upflow rate relative to the slurry downflow rate. The loaded carbon, with some entrained slurry, would be withdrawn from adjacent the top of the vessel 60 at point 63, and passed to a carbon screen 64, with the loaded carbon stripped and regenerated for reuse in the carbon injection system 61, and with separated slurry in conduit 65 returning to the top of the vessel 60. The residue withdrawn at the bottom 66 of the vessel 60 by the pump 67 would either pass into conduit 68 to be used as part of the liquid for carrying the recycled carbon into the column within the vessel 60, or would pass to conduit 69 and ultimately to cyanide destruction and disposal site 70.

The vessel 60 may be operated at atmospheric pressure, or at super-atmospheric pressure, and an oxygen atmosphere may be provided at the top thereof in either case. Also, the system could be operated so that the slurry flowed upwardly and the carbon granules flowed downwardly, if denser carbon were utilized, and/or if the slurry solids had a lower specific gravity.

Figure 3:
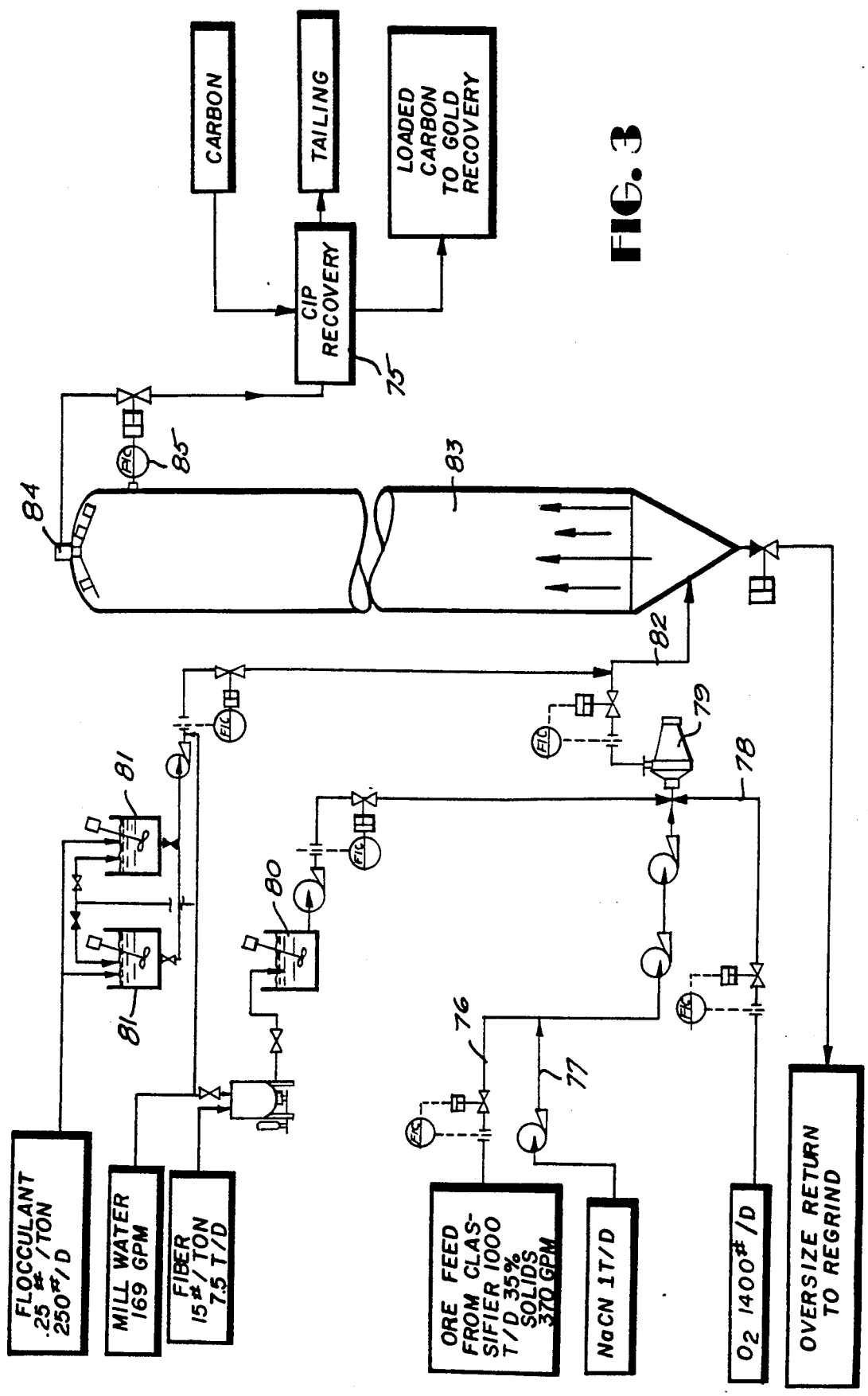
FIG. 3 is a schematic view of exemplary apparatus for increased efficiency of ore leaching which can precede the adsorption tanks of the enhanced CIP process according to the invention.

FIG. 3 schematically illustrates other exemplary apparatus that can be utilized for effectively and efficiently dissolving the gold and/or silver in the leaching stage prior to CIP recovery in station 75. Utilizing the apparatus of FIG. 3, the slurried ore in conduit 76 is mixed with cyanide from conduit 77, and ultimately mixed with oxygen from conduit 78 in a mixer 79. The mixer may be any suitable mixer capable of mixing components of a medium consistency slurry, such as an MC ® mixer sold by Kamyr, Inc. of Glens Falls, New York. Also, as generally disclosed in U.S. Pat. No. 4,501,721, flocculent and/or fiber can be added to the slurry to facilitate locking of the particulized ore in a stable network in the slurry. For instance cellulosic fibers, fiberglass fibers, or the like are mixed with liquid in tank 80 and then metered to the inlet to mixer 79, while flocculents, such as synthetic polymers of anionic, cationic, or nonionic types are mixed with mill water in tanks 81, and then ultimately passed to conduit 82 prior to introduction into upflow 83. The leached slurry that is discharged from the top 84 of vessel 83 will then pass to the CIP recovery station 75, which can be as illustrated in FIG. 1 (without the tank 22). The vessel 83 can also be pressurized, as by utilizing pressure control valve 85, and a one atmosphere, or super-atmospheric, oxygen atmosphere maintained therein, or the vessel can be completely slurry filled.

Utilizing the apparatus heretofore described, according to the present invention a process of gold and/or silver recovery from ore and the like may be practiced. The process comprises the steps of: leaching gold and/or silver from the ore or the like, to dissolve the gold and/or silver, utilizing a basic cyanide solution; and (b) recovering the leached gold and/or silver in solution by contacting the solution with solid material for adsorbing the gold and/or silver from the solution; wherein step (b) is practiced by providing oxygen gas in the solution in an amount significantly greater than can be obtained by contacting the solution with air so as to greatly increase the solution rate of the gold and/or silver, and by minimizing the amount of carbon dioxide in the solution so that it is significantly less than would be obtained by contacting the solution with air, so as to possibly increase the gold and/or silver adsorption efficiency of the adsorbing material, and certainly to reduce the production of $CaCO_3$. Preferably step (b) is practiced by substantially saturating the solution with oxygen, and preferably by utilizing generally pure oxygen.

The following table I indicates the results achieved by preparing a gold cyanide solution by leaching a common gold ore sample (the gold ore sample, as is typical, also contained a small amount of silver), and then exposing the solution to carbon adsorption in a rotating bottle for six hours, with atmospheres of air, oxygen, and nitrogen, respectively.

TABLE I

| | Atmosphere | | |
|---|---|---|---|
| | Oxygen | Air | Nitrogen |
| Approx. % $O_2$ in atmosphere | 100 | 21 | 0 |
| Leach solution assay, Au, mg/l | 4.14 | 4.14 | 4.14 |
| Final solution assay, Au, mg/l | 0.032 | 0.041 | 0.079 |
| Final carbon assay, Au, oz/ton | 23.4 | 23.1 | 23.1 |
| Au adsorption, %[1] | 99.23 | 99.01 | 98.10 |
| Leach solution assay, Ag, mg/l | 1.8 | 1.8 | 1.8 |
| Final solution assay, | 0.2 | 0.2 | 0.2 |

TABLE I-continued

|  | Atmosphere | | |
| --- | --- | --- | --- |
|  | Oxygen | Air | Nitrogen |
| Ag, mg/l |  |  |  |
| Final carbon assay, Ag, oz/ton | 8.77 | 8.97 | 8.36 |
| Ag adsorption, %[1] | 88.6 | 88.6 | 88.1 |

[1]Based on final carbon and final solution.

The following table II indicates the results from a carbon-in-pulp cyanidation test utilizing three different types of Gencor ore samples from, respectively, Buffeisfontein (No. 1), Leslie (No. 2), and St. Helena (No. 3). The tests indicate high gold extractions (in the range of 90–95 %), and, surprisingly, low cyanide consumption. All tests were performed in rotated bottles with oxygen atmosphere at the local atmospheric pressure of 12.1 psia. The time in each case (total of 10 hours) was a six hour cyanide leach plus a four hour CIP process.

TABLE II

|  | Test #1 | Test #2 | Test #3 |
| --- | --- | --- | --- |
| Conditions |  |  |  |
| Grind | 77.9% - 200 | 80% - 200 | 80% - 200 |
| % Solids | 27 | 27 | 27 |
| pH: initial/adj. | 8.7/10.9 | 9.0/10/8 | 9.0/10.7 |
| NaCN, initial g/l | 0.3 | 0.3 | 0.3 |
| Time, hr. | 10 | 10 | 10 |
| Feed |  |  |  |
| Weight, g | 300.0 | 300.0 | 300.0 |
| Au, oz/ton | 0.217 | 0.110 | 0.186 |
| Reagents added, total |  |  |  |
| CaO, g | 0.12 | 0.12 | 0.12 |
| NaCN, g | 0.25 | 0.25 | 0.25 |
| Carbon |  |  |  |
| Mesh size Tyler | 6 × 14 | 6 × 14 | 6 × 14 |
| Initial wt. g | 22.00 | 22.00 | 22.00 |
| Final wt, g | 22.05 | 22.11 | 22.09 |
| Au, oz/ton | 2.631 | 0.966 | 1.779 |
| Sol'n. end of test |  |  |  |
| NaCN, g/l | 0.276 | 0.245 | 0.264 |
| pH | 10.6 | 10.6 | 10.4 |
| Filtrate, total |  |  |  |
| Volume, ml | 1414 | 1453 | 1399 |
| Au, mg/l | 0.004 | 0.002 | 0.003 |
| Residue |  |  |  |
| Weight, g | 298.7 | 298.6 | 298.6 |
| Au, oz/ton | 0.017 | 0.004 | 0.015 |
|  |  |  | 0.015 rerun |
| Reagents consumed NaCN, lb/ton | 0.16 | 0.33 | 0.26 |
| Extraction, % Au | 92.0 | 94.7 | 89.8 |

In the following table III, further bottle-type tests were conducted for a carbon-in-leach cyanidation, confirming that simultaneous leaching and carbon adsorption in an oxygenated slurry results in rapid high gold extraction with low cyanide consumption. The ore tested in each of the two tests in table III was Gencor's Buffelsfontein ore. With gold extractions of about 91-92 %, in six hours, cyanide consumption was only 0.37–0.47 lbs. per ton. If the pulp density and carbon concentration was closer to expected plant conditions, cyanide consumption is expected to be as little as 0.19–0.27 lbs. per ton. The low cyanide consumption is very unexpected and advantageous.

TABLE III

|  | Test #1 | Test #2 |
| --- | --- | --- |
| Conditions |  |  |
| Grind | 77.9% - 200 | 77.9% - 200 |
| % Solids | 27 | 27 |
| pH: initial/adj. | 8.7/10.9 | 8.7/10.9 |
| NaCN, initial g/l | 0.3 | 0.3 |
| Time, hr | 6[1] | 6[2] |
| Feed |  |  |
| Weight, g | 399.9 | 399.9 |
| Au, oz/ton | 0.217 | 0.217 |
| Reagents added, total |  |  |
| CaO, g | 0.12 | 0.12 |
| NaCN, g | 0.25 | 0.25 |
| Carbon |  |  |
| Mesh size, Tyler | 6 × 14 | 6 × 14 |
| Initial wt. g | 22.00 | 22.00 |
| Final wt, g | 22.26 | 22.07 |
| Au, oz/ton | 2.684 | 2.695 |
| Sol'n, end of test |  |  |
| pH | 10.5 | 10.6 |
| Filtrate, total |  |  |
| Volume, ml | 1412.67 | 1417.76 |
| NaCN, g/l | 0.24 | 0.22 |
| Residue |  |  |
| Weight, g | 298.24 | 298.48 |
| Au, oz/ton | 0.019 | 0.018 |
| Reagents consumed NaCN, lb/ton | 0.37 | 0.47 |
| Extraction, % Au | 91.3 | 91.7 |
| Calculated heads Au, oz/ton | 0.219 | 0.217 |

[1]Pre-saturated with $O_2$ at amb. press. for 16 hours previous to leach.
[2]During 6 hr CIP leach, purge with $O_2$ at T = 0 hr and T = 1 hr. Also add 11 g carbon at each of these times.

In conclusion, according to the present invention, a method and apparatus are provided for the extremely efficient and effective recovery of gold and/or silver from ore or the like. While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent process and apparatus.

What is claimed is:

1. In the recovery of gold or silver from an ore slurry, an adsorbent-in-leach process comprising the steps of simultaneously, in the same vessel: (a) leaching gold or silver from the ore slurry, to dissolve the gold or silver, utilizing a basic cyanide solution; and (b) recovering the leached gold or silver in solution by contacting the slurry with an adsorbing material selected from the group consisting essentially of activated charcoal granules and ion-exchange resins for adsorbing the gold or silver from the solution; wherein steps (a) and (b) are practiced by providing a dissolved oxygen concentration in the slurry that is significantly greater than a dissolved oxygen concentration in the slurry if the slurry is contacted with air under identical pressure conditions such that increased gold or solver extraction per unit time occurs as compared with contacting the slurry with air; and wherein steps (a) and (b) are practiced in a covered vented vessel so as to decrease the transfer of oxygen out of solution and decrease the transfer of nitrogen or carbon dioxide into the slurry.

2. In the recovery of gold or silver from an ore slurry, an adsorbent-in-leach process comprising the steps of simultaneously, in the same vessel: (a) leaching gold or silver from the ore slurry, to dissolve the gold or silver, utilizing a basic cyanide solution; and (b) recovering the leached gold or silver in solution by contacting the slurry with an adsorbing material selected from the group consisting essentially of activated charcoal granules and ion-exchange resins for adsorbing the gold or silver from the solution; wherein steps (a) and (b) are practiced by providing a dissolved oxygen concentration in the slurry that is significantly greater than a dissolved oxygen concentration in the slurry if the slurry is contacted with air under identical pressure conditions such that increased gold or silver extraction per unit time occurs as compared with contacting the slurry with air; and wherein steps (a) and (b) are further practiced by providing the slurry and adsorbing material in a vessel, and maintaining an oxygen atmosphere in the top of the vessel.

3. A process as recited in claim 2 comprising the further step of degassing the slurry before practicing steps (a) and (b).

4. A process as recited in claim 2 wherein the pressure in the vessel is maintained at a pressure greater than one atmosphere so as to increase the concentration of oxygen in the solution.

5. A process as recited in claim 2 wherein steps (a) and (b) are practiced by directing the flow of the ore slurry in a first direction, and directing a flow of adsorbing material in a second direction, opposite the first direction.

6. A process as recited in claim 2 wherein steps (a) and (b) are further practiced by agitating the slurry and 7. A process as recited in claim 6 wherein said agitating step is practiced by mechanically agitating the slurry and adsorbing material.

8. In the recovery of gold or silver from an ore slurry, an adsorbent-in-leach process comprising the steps of simultaneously, in the same vessel: (a) leaching gold or silver from the ore slurry, to dissolve the gold or silver, utilizing a basic cyanide solution; and (b) recovering the leached gold or silver in solution by contacting the slurry with an adsorbing material selected from the group consisting essentially of activated charcoal granules and ion-exchange resins for adsorbing the gold or silver from the solution; wherein steps (a) and (b) are practiced by providing a dissolved oxygen concentration in the slurry that is significantly greater than a dissolved oxygen concentration in the slurry if the slurry is contacted with air under identical pressure conditions such that increased gold or silver extraction per unit time occurs as compared with contacting the slurry with air; and wherein steps (a) and (b) are further practiced by agitating the slurry and adsorbing material and the agitating step is practiced by introducing oxygen gas under pressure into the bottom of a vessel containing the slurry and the adsorbing material.

9. A process as recited in claim 8 such that the consumption of the cyanide is decreased by using said greater dissolved oxygen concentration in the slurry as compared with using the dissolved oxygen concentration in the slurry if the slurry is contacted with air under identical pressure conditions for the same amount of gold or silver extracted from the ore.

10. A process as recited in claim 8 wherein steps (a) and (b) are carried out in each of a plurality of serially connected vessels and including the further steps of directing the flow of the ore slurry in a first direction serially through said vessels and directing a flow of adsorbing material in a second direction serially through said vessels opposite the first direction.

11. A process according to claim 10 such that the consumption of the cyanide is decreased by using said greater dissolved oxygen concentration in the slurry as compared with using the dissolved oxygen concentration in the slurry if the slurry is contacted with air under identical pressure conditions for the same amount of gold or silver extracted from the ore.

12. A process according to claim 11 comprising the further step of degassing the slurry before practicing steps (a) and (b), and wherein the step of recovering the leached gold or silver in solution includes contacting the slurry with activated carbon granules for adsorbing the gold or silver from the solution.

13. A process according to claim 12 wherein the activated carbon granules are non-deoxygenated prior to contact with the slurry.

14. In the recovery of gold or silver from an ore slurry, an adsorbent-in-leach process comprising the steps of simultaneously, in the same vessel: (a) leaching gold or silver from the ore slurry, to dissolve the gold or silver, utilizing a basic cyanide solution; and (b) recovering the leached gold or silver in solution by contacting the slurry with an adsorbing material selected from the group consisting essentially of activated charcoal granules and ion-exchange resins for adsorbing the gold or silver from the solution; wherein steps (a) and (b) are practiced by providing a dissolved oxygen concentration in the slurry that is significantly greater than a dissolved oxygen concentration in the slurry if the slurry is contacted with air under identical pressure conditions such that increased gold or silver extraction per unit time occurs as compared with contacting the slurry with air; and wherein steps (a) and (b) are practiced by directing the flow of the ore slurry in a first direction, and directing a flow of adsorbing material in a second direction, opposite the first direction and such that the consumption of the cyanide is decreased by using said greater dissolved oxygen concentration in the slurry as compared with using the dissolved oxygen concentration in the slurry if the slurry is contacted with air under identical pressure conditions for the same amount of gold or silver extracted from the ore; and wherein the steps (a) and (b) are practiced in a covered vessel so as to decrease the transfer of oxygen out of solution and decrease the transfer of nitrogen or carbon dioxide into the slurry.

15. A process according to claim 14 wherein steps (a) and (b) are further practiced by providing the slurry and adsorbing material in a vessel, and maintaining an oxygen atmosphere in the top of the vessel.

16. A process according to claim 15 wherein the dissolved oxygen concentration is provided by introducing oxygen gas under pressure into the bottom of the vessel containing the slurry and the adsorbing material.

17. A process according to claim 16 comprising the further step of degassing the slurry before practicing steps (a) and (b).

18. In the recovery of gold or silver from an ore slurry, an adsorbent-in-leach process comprising the steps of simultaneously, in the same vessel: (a) leaching gold or silver from the ore slurry, to dissolve the gold or silver, utilizing a basic cyanide solution; and (b) recovering the leached gold or silver in solution by contacting the slurry with an adsorbing material selected from the group consisting essentially of activated charcoal granules and ion-exchange resins for adsorbing the gold or silver from the solution; wherein steps (a) and (b) are practiced by providing a dissolved oxygen concentration in the slurry that is significantly greater than a dissolved oxygen concentration in the slurry if the slurry is contacted with air under identical pressure conditions such that increased gold or silver extraction per unit time occurs as compared with contacting the slurry with air; and introducing oxygen gas under pressure into the bottom of the vessel containing the slurry and the adsorbing material.

19. In the recovery of gold or silver from an ore slurry, an adsorbent-in-leach process comprising the steps of simultaneously, in the same vessel: (a) leaching gold or silver from the ore slurry, to dissolve the gold or silver, utilizing a basic cyanide solution; and (b) recovering the leached gold or silver in solution by contacting the slurry with an adsorbing material selected from the group consisting essentially of activated charcoal granules and ion-exchange resins for adsorbing the gold or silver from the solution; wherein steps (a) and (b) are practiced by providing a dissolved oxygen concentration in the slurry that is significantly greater than a dissolved oxygen concentration in the slurry if the slurry is contacted with air under identical pressure conditions such that increased gold or silver extraction per unit time occurs as compared with contacting the slurry with air; and introducing generally pure oxygen into the slurry in contact with the adsorbing material.

20. A process according to claim 19 wherein steps (a) and (b) are practiced by directing the flow of the ore slurry in a first direction, and directing a flow of adsorbing material in a second direction, opposite the first direction and such that the consumption of the cyanide is decreased by using said greater dissolved oxygen concentration in the slurry as compared with using the dissolved oxygen concentration in the slurry if the slurry is contacted with air under identical pressure conditions for the same amount of gold or silver extracted from the ore.

21. A process according to claim 19 wherein steps (a) and (b) are practiced at about atmospheric pressure.

22. A process according to claim 19 wherein said generally pure oxygen has an oxygen content of about 99 %.

* * * * *